United States Patent
Golle et al.

(10) Patent No.: US 7,721,107 B2
(45) Date of Patent: May 18, 2010

(54) PHYSICAL TOKEN FOR SUPPORTING VERIFICATION OF HUMAN PRESENCE IN AN ONLINE ENVIRONMENT

(75) Inventors: Philippe Golle, San Francisco, CA (US); Nicolas B Ducheneaut, Mountain View, CA (US)

(73) Assignee: Palo Alto Research Center Incorporated, Palo Alto, CA (US)

( * ) Notice: Subject to any disclaimer, the term of this patent is extended or adjusted under 35 U.S.C. 154(b) by 1134 days.

(21) Appl. No.: 11/276,055

(22) Filed: Feb. 10, 2006

(65) Prior Publication Data

US 2007/0192849 A1    Aug. 16, 2007

(51) Int. Cl.
*G06F 21/00*    (2006.01)

(52) U.S. Cl. .................. 713/184; 713/172; 713/185

(58) Field of Classification Search ............ 726/5, 726/2, 9, 28; 713/182, 184–185, 168, 172; 386/46; 705/64
See application file for complete search history.

(56) References Cited

U.S. PATENT DOCUMENTS

| | | | | |
|---|---|---|---|---|
| 2003/0194200 A1* | 10/2003 | Yuen et al. | .................. | 386/46 |
| 2004/0003258 A1* | 1/2004 | Billingsley et al. | .......... | 713/182 |
| 2007/0143624 A1* | 6/2007 | Steeves | ................. | 713/182 |

OTHER PUBLICATIONS

David Adams, "Blizzard bans bot bullies", available on the Internet, http://pc.ign.com/articles/571/571579p1.html?fromint=1, dated Dec. 7, 2004.
"Advanced Encryption Standard (AES)", Federal Information Processing Standards Publication 197, available on the Internet http://csrc.nist.gov/publications/fips/fips197/fips-197.pdf, Nov. 26, 2001.
Luis Von Ahn, Manuel Blum, Nicholas J. Hopper, and John Langford, "CAPTCHA: Using Hard AI Problems For Security", Advances in Cryptology—EUROCRYPT'03, vol. 2656, pp. 294-311, 2003.
Luis Von Ahn, Manuel Blum, John Langford, "Telling Humans and Computers Apart Automatically", Communications of The ACM Feb. 2004, vol. 47, No. 2, pp. 57-60.
R. Bartle, "Designing virtual worlds", Chapter 3, New Riders Publishing, Indianapolis, IN., 2004.
Mike Brunker, "Are poker 'bots' raking online pots?", published on the Internet, at http://www.msnbc.msn.com/id/6002298/, last updated Sep. 21, 2004.

(Continued)

*Primary Examiner*—Kimyen Vu
*Assistant Examiner*—Edward Zee
(74) *Attorney, Agent, or Firm*—Park, Vaughan & Fleming, LLP (57) ABSTRACT

A physical token operates together with an online server to test whether a user operating a user computer to access a service available at the online server is human. The physical token has two states: inactive and active. When in the inactive state the physical token displays interaction instructions for performing a physical action on the token. When the interaction instructions are satisfied, the physical token transitions to the active state and displays a response that may be used for satisfying a challenge issued by the online server to the user seeking to access the service.

16 Claims, 4 Drawing Sheets

OTHER PUBLICATIONS

Justin Calvert, "Gaming as spectator sport", In Gamespot, Jan. 19, 2003, available on the Internet at http://www.gamespot.com/gamespot/features/all/gamespotting/011903/4.html.

"Telling Humans and Computers Apart (Automatically)", The CAPTCHA Project, available on the Internet at http://www.captcha.net/ Jan. 30, 2006.

Edward Castranova, "On Virtual Economies", Game Studies, vol. 3, Issue 2, Dec. 2003, available on the Internet at http://www.gamestudies.org/0302/castronova/.

"City of Heroes", Web Cite, available on the Internet at http://www.cityofheroes.com/.

A.L. Coates, H.S. Baird, R.J. Fateman, "Pessimal Print: A Reverse Turing Test," in Proc., 6th International Conference on Document Analysis and Recognition, Seattle, WA, USA, Sep. 10-13, pp. 1154-1158, 2001.

Julian Dibbell, "Serfing the Web: Black Snow Interactive and the world's First virtual sweat shop" available on the Internet at http://www.juliandibbell.com/texts/blacksnow.html, dated Jan. 2003.

Nicolas Ducheneaut, and Robert Moore, "The social side of gaming: a study of interaction patterns in a massively multiplayer online game", Proceedings of the ACM conference on Computer-Supported Cooperative Work (CSCW2004), ACM, New York, (2004), 360-369.

C. Foo, and E. Koivisto, "Grief Player Motivations", in proceedings of the Other Players, conference on multiplayer phenomena, Copenhagen, Dec. 6-8, 2004.

Philippe Golle, and Nicolas Ducheneaut, "Keeping bots out of online games", ACM SIGCHI International Conference on Advances in Computer Entertainment Technology, Valencia Spane, Jun. 15-17, 2005.

Philippe Golle, and Nicolas Ducheneaut, "Preventing Bots from Playing Online Games", in the ACM Computers in Entertainment, vol. 3, Jul. 2005.

Dave Kosak, "The automated online role-player", available on the Internet at http://archive.gamespy.com/fargo/august03/autorpg/index.shtml, dated Aug. 22, 2003.

Raph Koster, "Raph Koster's Website", available on the Internet at http://www.legendmud.org/raph/gaming/index.html Jan. 30, 2006.

Raph Koster, "A theory of fun for game design", Chapter 3, Paraglyph Press, 2005.

Asher Moses, "Cheating: Multiplayer gaming Achille's heel?", available on the Internet at http://www.tomshardware.com/game/20030517/cheating-03.html, dated May 17, 2003.

RSA SecureID Technical Specifications, available on the Internet at http://www.rsasecurity.com/ Jan. 30, 2006.

B. Schneier, "Applied Cryptography", Sections 3.2 and 3.3 John Wiley & Sons, 2nd edition, 1996.

Second Life Site, available on the Internet at http://www.secondlife.com Jan. 30, 2006.

Star Wars Galaxies Site, available on the Internet at http://www.starwarsgalaxies.com Jan. 30, 2006.

S. Stubblebine, and P.C. Van Oorschot, "Addressing Online Dictionary Attacks with Login Histories and Humans-in-the-Loop", in Financial Cryptography'04, Springer-Verlag LNCS 3110, 2004.

Laila Weir, "Boring game? Outsource it", Wired News, available on the Internet at http://www.wired.com/news/digiwood/0,1412,64638,00.html?tw=wn_1culthead, dated Aug. 24, 2004.

Bruce Woodcock, "An Analysis of MMOG Subscription Growth—Version 18.0" available on the Internet at http://www.mmogchart.com/Analysis.html Jan. 30, 2006.

World of Warcraft Community Site, available on the Internet at http://www.worldofwarcraft.com/.

\* cited by examiner

PHYSICAL TOKEN FOR SUPPORTING VERIFICATION OF HUMAN PRESENCE IN AN ONLINE ENVIRONMENT

CROSS REFERENCE TO RELATED APPLICATION

Cross-reference is made to U.S. patent application Ser. No. 11/276,058 filed concurrently herewith and entitled "XOR Encoded Document For Secure Message Exchange", which is assigned to the same assignee as the present invention and incorporated herein by reference.

BACKGROUND AND SUMMARY

The following relates generally to methods, unit and articles of manufacture therefor, for verifying human presence in an online environment.

There exist a variety of automated tests for telling humans and computers apart in an online environment. Such tests are collectively known as CAPTCHA (Completely Automated Public Turing Test to Tell Computers and Humans Apart) tests. A CAPTCHA test is a program that can generate and grade tests that most humans can pass but that current computer programs cannot. CAPTCHA tests are of necessity heuristic; there is no way to prove that a computer program cannot pass a test that a human can pass. CAPTCHA tests are adapted to exploit gaps between the abilities of humans and computers.

CAPTCHA tests may be used at the start of or during an online application, such as a multi-player game, to verify human presence as opposed to an automated operator (otherwise known as a "bot" or automated player agent). The CAPTCHA test may or may not be directly integrated with the online application. CAPTCHA tests that are not integrated with online applications are referred to herein as out-of-band CAPTCHA tests. Such out-of-band CAPTCHA tests are flexible in that they may be used with a varied number of online applications. CAPTCHA tests that are tightly integrated into an application (such as a game) are less likely (depending on their method) to be disruptive to the user.

A wide range of CAPTCHA testing strategies is possible. In multi-player game applications for example, a single CAPTCHA challenge may be presented when a player joins a game; alternatively, repeated CAPTCHA challenges may be presented to the player at random intervals over the course of a game. The game may on occasion allow a player not to reply or to give an incorrect answer. A player that fails one or several challenges may be suspended from the game, temporarily for a limited period of time, or permanently (in which case all progress made in the game is lost). CAPTCHA tests deter bots most effectively in long stateful games where players have a lot to lose if they fail a test; games played in short, stateless rounds may require more frequent tests.

A drawback with known CAPTCHA tests is that the tests may be delegated by an automated user to a user that is a human to perform the test. For example, with multi-player online games, know CAPTCHA test may be solved by a human, but that human need not be the user playing the game. That is, known CAPTCHA tests are susceptible to relay attacks in which automated player agents direct digital CAPTCHA tests that require human evaluation to a user that is human to solve the test. The cost of setting up a relay attack may be prohibitive to solve a single digital CAPTCHA test (e.g., when opening a new email account), but it becomes negligible if it can be amortized over many tests, as in online games.

Additional background on the use of CAPTCHA tests and their limitations is disclosed in the following publications which are incorporated herein by reference: Luis von Ahn, Manuel Blum, Nicholas J. Hopper, and John Langford, "CAPTCHA: Using Hard AI Problems For Security", Advances in Cryptology—EUROCRYPT'03, Vol. 2656, pp. 294-311, 2003; and Philippe Golle and Nicolas Ducheneaut, "Preventing Bots from Playing Online Games", in the ACM Computers in Entertainment, Vol. 3, July, 2005, which is incorporated herein by reference.

Accordingly, there continues to be a need for improved CAPTCHA test for distinguishing bots from human players in various online applications. Such improved CAPTCHA tests would advantageously be computationally resistant (i.e., are not readily carried out by a bot without undue expense), not readily outsourced (i.e., not readily carried out by a third-party human), and non-disruptive (i.e., do not deleteriously disrupt a human's interaction with the online application).

In accordance with the various embodiments disclosed herein, there is provided a computer implemented method, apparatus and article of manufacture therefor, for verifying human presence in an online environment using a CAPTCHA (or physical) token. In operation, a challenge is issued from an application server (e.g., first computational unit) to a user computer (e.g., second computational unit) after the user computer communicates a request to access a service provided by the application server. A response is computed at the CAPTCHA token (e.g., third computational unit) using a function that takes as input a synchronization measure and a key shared with the application server. The computed response is computed for satisfying the challenge issued by the application server to the user computer and displayed on a user interface of the CAPTCHA token only if interaction instructions involving a physical challenge output on the user interface are satisfied. Input is received at the user computer representing the response displayed on a user interface of the CAPTCHA token. The input received representing response from the user computer is transmitted to the application server for satisfying the challenge issued by the application server. Access to the service to the user computer is enabled by the application server after the challenge is satisfied. The challenge is satisfied at the application server when the response received from the user computer is authenticated using a function that takes as input the response and the key shared with the CAPTCHA token.

In accordance with one of the various embodiments disclosed herein: the each synchronization measure shared between the application server and the user computer is one of a measure of time output by a clock, a counter, and a nonce output by a computational unit; the key shared between the application server and the user computer is a key for a symmetric cipher; the function is computed at the CAPTCHA token with a symmetric cipher that takes as input a synchronization measure and the symmetric key shared with the application server; and the response received from the user computer is deciphered by the application server using a symmetric cipher that takes as input the ciphertext response and the symmetric key shared with the CAPTCHA token.

BRIEF DESCRIPTION OF THE DRAWINGS

These and other aspects of the disclosure will become apparent from the following description read in conjunction with the accompanying drawings wherein the same reference numerals have been applied to like parts and in which.

DETAILED DESCRIPTION

A. Definition of Terms

The terms defined below have the indicated meanings throughout this application, including the claims and the figures:

"Physical CAPTCHA" is used herein to mean an apparatus having one or more of a combination of user input devices (e.g., a keyboard, mouse, joystick, touchpad, keypad, speaker, camera, and touch screen) that accepts physical input (e.g., motion, pressure, sound, etc.) and produces digital output (or response). A user of the physical CAPTCHA may only learn of the digital output at some given time after the user has physically produced input using a user input device. To prove the digital output arrived at a given time, the output must be capable of being authenticated.

A physical CAPTCHA is "tamper-proof" if it loses its ability to produce digital output that is capable of being authenticated when it is tampered with. For example, any attempt to bypass an interface (e.g., by opening a device and rewiring its microcontroller), such as its user input device, may cause a physical CAPTCHA to lose its authentication key.

"CAPTCHA token" and "CAPTCHA input device" are used herein to mean different embodiments of a physical CAPTCHA.

B. Example Operating Environment of the CAPTCHA Token

Figure 1:
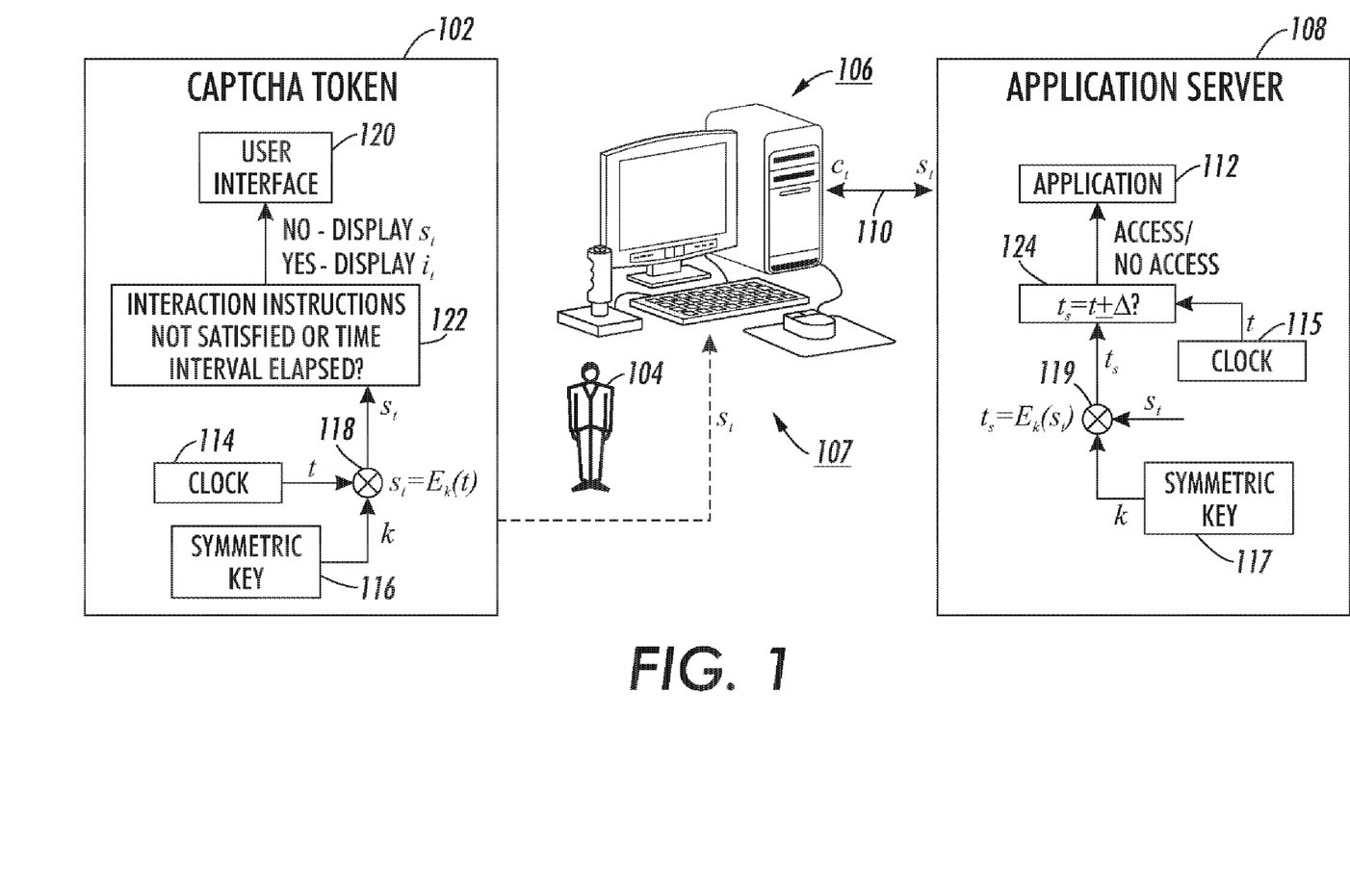
FIG. 1 illustrates an example environment in which a CAPTCHA token is used.

FIG. 1 illustrates an example environment for using a CAPTCHA token 102 (also referred to as a third computational unit). The CAPTCHA token 102 is a physical CAPTCHA for supporting the verification of human presence in an online environment, such as, between a human user 104 operating user computer 106 (also referred to as second computational unit) and an application server 108 (also referred to as a first computational unit). The user computer 106 (with user input devices 107) and the application server 108 have an established communication channel 110, whereas the CAPTCHA token has, in one embodiment, no input connectivity with the user computer 106 or the application server 108. In operation, the CAPTCHA token 102 is used by the user 104 to satisfy interaction instructions $i_t$ that involve a physical challenge before receiving a response for satisfying a digital challenge $c_t$ issued by the application server 108.

Figure 2:
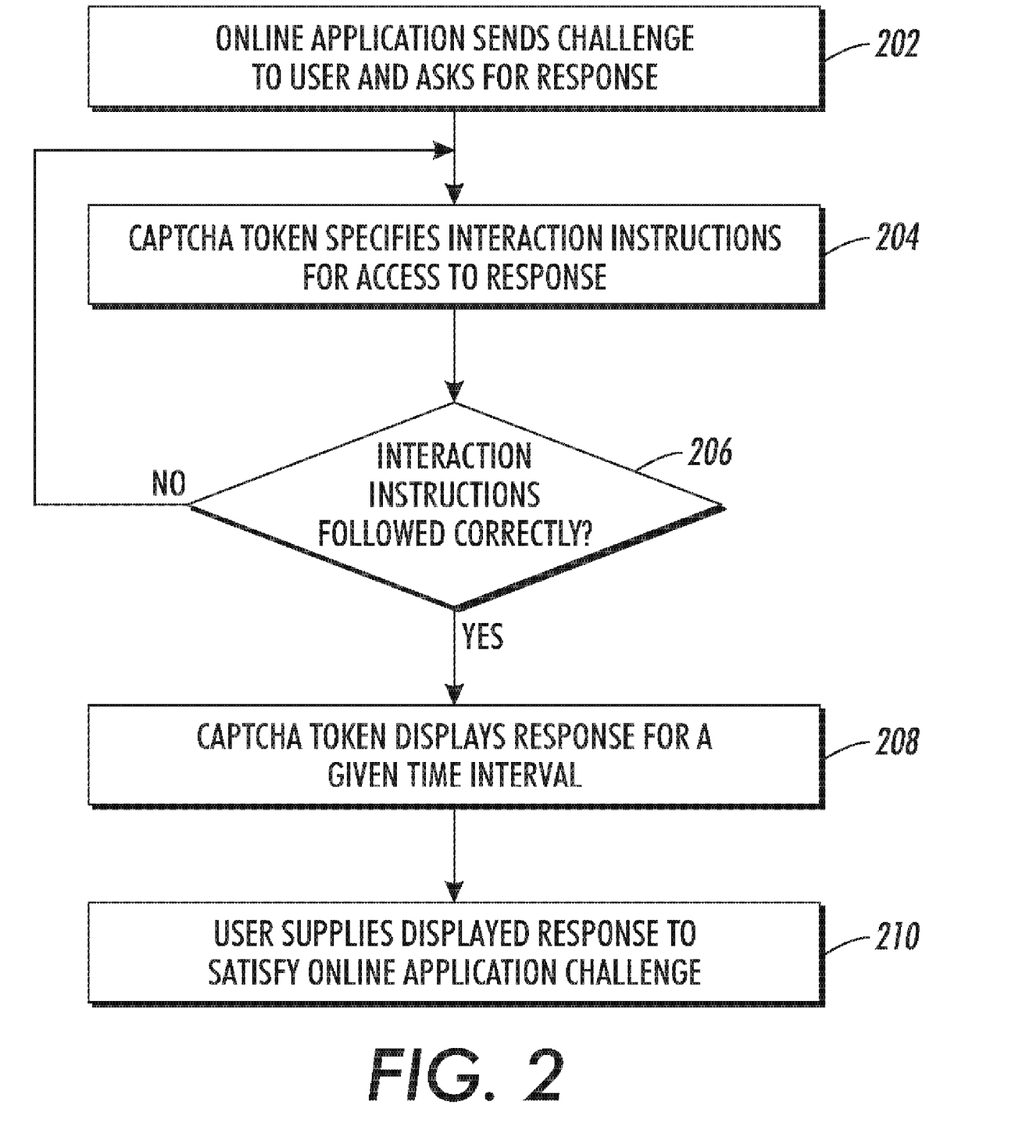
FIG. 2 sets forth a series of operations for allowing an application server to verify the presence of human user operating a user computer using a CAPTCHA token.

By way of overview, FIG. 2 sets forth a series of operations for allowing the application server 108 to verify the presence of human user 104 operating the user computer 106 using the CAPTCHA token 102. At 202, when user computer 106 requests access to the application 112, it is issued a challenge ct by the application server 108 and is prompted to enter a response $s_t$ (e.g., ciphertext or cryptographic digest st that is displayed at the user interface 120 of the CAPTCHA token 102 when in an active state). At 204, the CAPTCHA token 102 specifies interaction instructions $i_t$ (when in an inactive state) to be carried out (by the user 104) for access to the response $s_t$. If the interaction instructions $i_t$ are not followed correctly at 206, the CAPTCHA token 102 (remains in an inactive state and) reissues or issues new interaction instructions (e.g., $i_t$ or $i_{t+1}$) to be satisfied for access to the response $s_t$ at 204; otherwise, when the interaction instructions $i_t$ are followed correctly (at 206), the CAPTCHA token 102 (transitions to an active state and) displays the response $s_t$ requested to satisfy the challenge $c_t$ issued by the application server 108 for a given time interval (at 208). At 210, the user supplies (either manually or automatically) the displayed response at the user computer 106 to satisfy the challenge $c_t$ issued by the application server 108 for access to the application 112.

More specifically (at 202), the application server 108 offers to human user 104 through user computer 106 access to an application 112. In one embodiment, the application 112 is a multi-player online game, where the human user 104 seeks to be (or continue to be) a participant in the game through a local presence running on user computer 106 for exchanging data with the application 112 operating on the application server 108. The function of the CAPTCHA token 102 is to enable the application 112 to test using a physical action component whether the user 104 operating the local presence at the user computer 106 is human. The CAPTCHA token 102 does not serve as input to the application 112, and thus may be used in performing a similar function with a number of different applications. That is, the CAPTCHA token 102 provides input to the application 112 that is response-specific (i.e., for the purpose of satisfying a response to a challenge) but not application-specific and thus may be used to perform a similar function with different applications.

The CAPTCHA token 102 may take on a number of forms for performing the function of testing using a physical action component. In the different forms, the CAPTCHA token 102 includes a synchronization measure (e.g., clock 114, a counter, or a nonce supplied by a computational unit), memory for storing a shared key (e.g., symmetric key memory 116), a cryptographic processing or computational unit (e.g., symmetric cipher computational unit 118, or a hash function computational unit), and a user interface 120.

Figure 3:
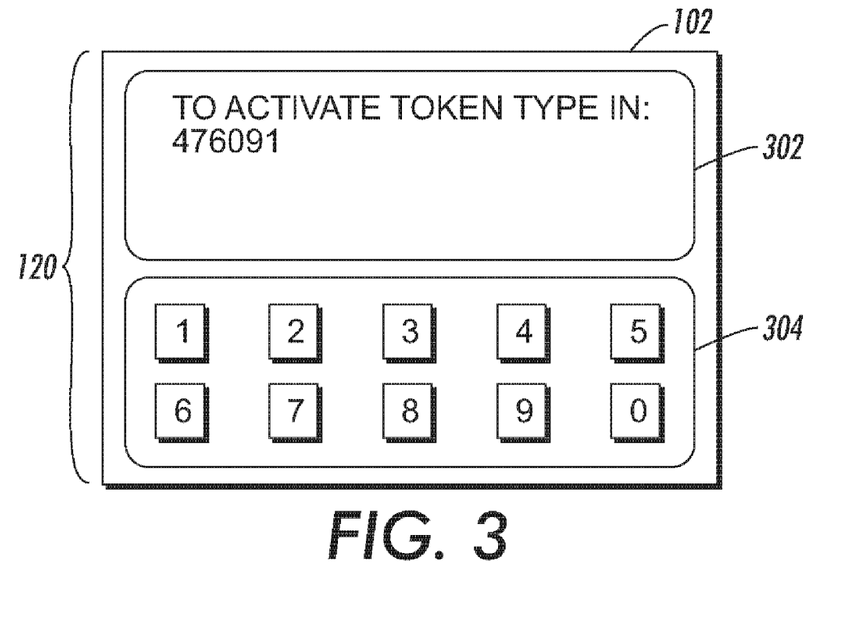
FIGS. 3 and 4 illustrate a first embodiment of a user interface of a CAPTCHA token.
Figure 4:
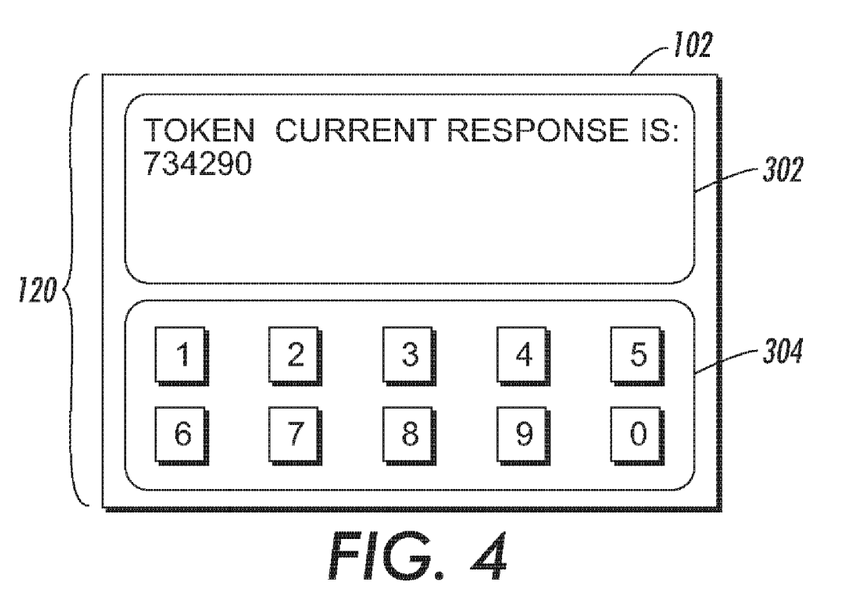
Figure 5:
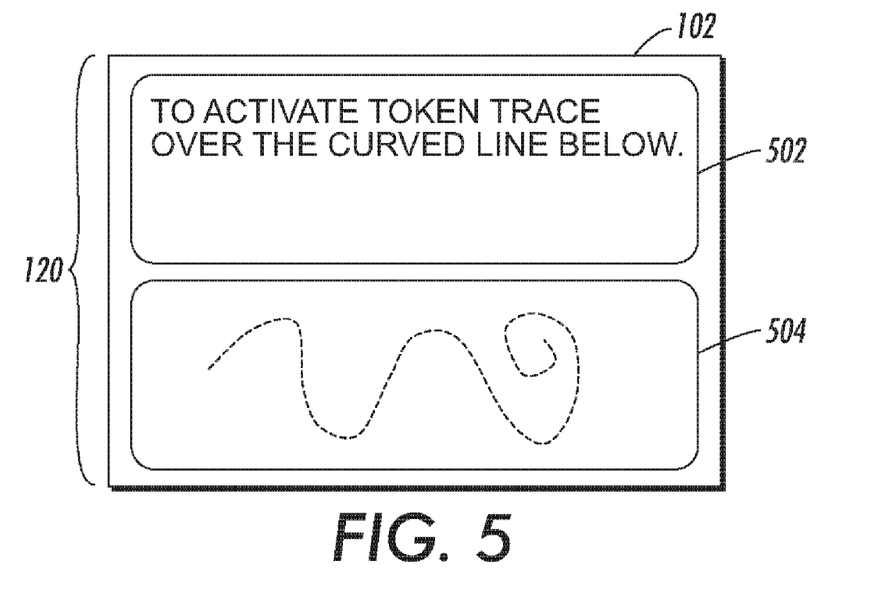
FIGS. 5 and 6 illustrate a second embodiment of a user interface of a CAPTCHA token.
Figure 6:
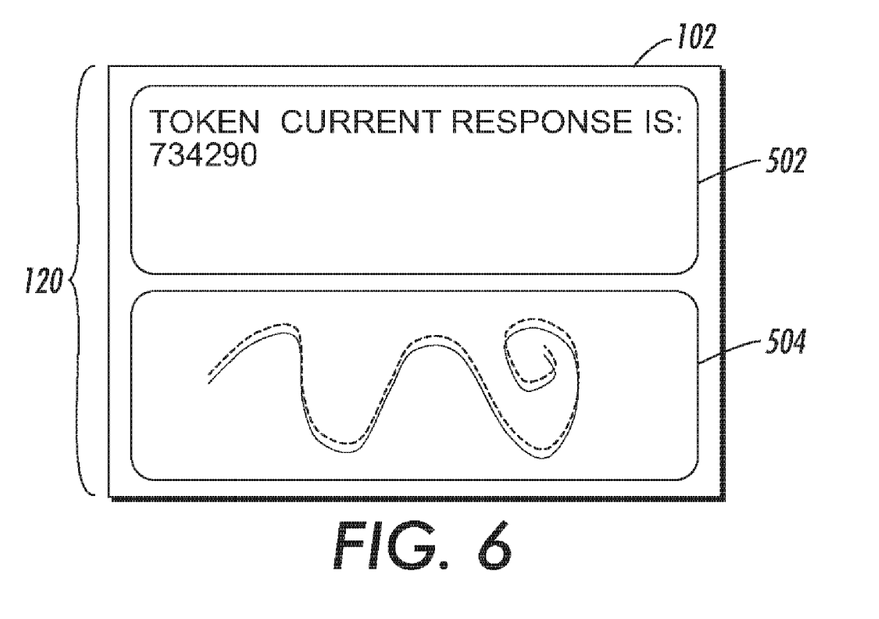

FIGS. 3-4 illustrate one embodiment and FIGS. 4-6 illustrate another embodiment of different forms that the user interface 120 may take to enable the physical action component of the CAPTCHA test. The user interface 120 may be equipped with one or more of a combination of a keypad, touchpad, screen, microphone, accelerometer, or speaker to request and measure performance of a physical action. In one embodiment, the CAPTCHA token is tamper-proof as data may only be entered (or input) to the CAPTCHA token through a user interface with keys that must be depressed on a keypad or with identified areas on a touchpad that must be depressed.

More specifically (at 204), FIGS. 3 and 4 illustrate a first embodiment and FIGS. 5 and 6 illustrate a second embodiment in which the CAPTCHA token 102 is in a first state in FIGS. 3 and 5 and a second state in FIGS. 4 and 6. In FIG. 3, the CAPTCHA token 102 includes a user interface 120 in which the user 104 is issued interaction instructions in first area 302 that request a user to perform the physical action of typing in a series of numbers into touchpad in second area 304 to activate the CAPTCHA token 102. Once the interaction instructions $i_t$ are satisfied, the CAPTCHA token 102 is activated and a current response $s_t$ is displayed in the first area 302 of the user interface 120 as shown in FIG. 4. In FIG. 5, the CAPTCHA token 102 includes a user interface 120, in which the user 104 is issued interaction instructions in first area 502 that request a user to perform the physical action of tracing a curve on a touchpad in second area 504 using, for example, a stylus to activate the CAPTCHA token 102. Once the interaction instructions $i_t$ are satisfied, the CAPTCHA token 102 is activated and a current response $s_t$ is displayed in the first area 502 of the user interface 120 as shown in FIG. 6.

In alternate embodiments, the user interface 120 of the CAPTCHA token 102 includes one or a plurality of displays, accelerometers, keypads, screens, microphones, and/or touchpads that operate as an integral unit or as independent units to issue a series of interaction instructions that need to be satisfied with a physical action before a current response $s_t$ may be displayed. Each time interaction instructions are issued on the user interface 120, they may appear static (e.g., a keypad that does not change the location of its digits each time new interaction instructions are issued) or dynamic (e.g., a touchpad that changes the location of its digits each time new interaction instructions are issued).

When in operation, the CAPTCHA token 102 may be in one of two states: active or inactive. When in an active state, the CAPTCHA token displays on its user interface 120 the value $s_t$ computed by a function E 118 (shared with the application server 108) that takes as input a current synchronization measure t produced, for example, by clock 114, a counter (not shown), or a value (a nonce) output by computational unit, and key shared with the application server 108. In one embodiment, the value $s_t$ is updated each interval the time t is incremented. When inactive, the CAPTCHA token displays a random instruction $i_r$, which is referred to herein as interaction instructions $i_r$. The CAPTCHA token 102 transitions from its inactive state to its active state for a set time interval at switch 122, when the user 104 enters input at the user interface 120 that satisfies the current interaction instruction $i_r$ displayed at the user interface 120.

In one embodiment (at 208), the CAPTCHA token 102 remains in the active state once the interaction instructions $i_r$ are satisfied for a time interval on the order of one to two minutes. In other embodiments, the time interval varies depending, for example, on one or more factors such as the application. Once the time interval expires, the CAPTCHA token 102 transitions to the inactive state, and re-transitions back to the active state only once the currently issued interaction instructions $i_r$ are re-satisfied. In satisfying or re-satisfying the interaction instructions $i_r$, the user is not required to recall a secret code; the purpose of the interaction instructions $i_r$ are to test (or challenge) on the basis of a specified physical action whether the user of the CAPTCHA token 102 is human as opposed to an automated computational agent (or bot).

Once the interaction instructions $i_r$ are satisfied and the response $s_t$ displayed on the user interface 120 of the CAPTCHA token 102 (at 208), the response $s_t$ may be used (at 210) by the user 104 to authenticate a human presence by delivering the response $s_t$ to the application server 108 to satisfy its issued challenge $c_t$. In one embodiment, once the CAPTCHA token 102 is placed in an active state by the user 104 after satisfying the current interaction instructions $i_r$, the user 104 enters the response $s_t$ displayed at the user interface 120 manually using a user input device 107 of the user computer 106 to satisfy a challenge $c_t$ issued by the application server 108. In an alternate embodiment in which there exists some form of output connectivity between the CAPTCHA token 102 and the user computer 106, the response $s_t$ is automatically transmitted to the application server once interaction instructions $i_r$ are satisfied. Upon receipt of the response $s_t$, the application server 108 tests the response $s_t$ received from the user computer 106 by performing cryptographic computations using computation unit 119.

C. Response Authentication

In preparing the response $s_t$ for display (at 206), the CAPTCHA token 102 prepares one of a sequence of numbers $(s_1, s_2, s_3, \ldots)$ that may each be authenticated by the application server 108. In one embodiment, each number s in the sequence of numbers is ciphertext that has a limited number of digits (e.g., 5). In an alternate embodiment, each number s is cryptographic hash (or one-way hash). In either embodiment, the knowledge of values $(s_1, s_2, s_3, \ldots s_t)$ generally does not aid in learning value $s_{t+1}$.

In one embodiment (at 208), the response $s_t$ is produced from sequence of ciphertext $(s_1, s_2, s_3, \ldots)$ computed using a symmetric cipher E 118 defined as $s_t=E_k(t)$ (e.g., that follows the Advanced Encryption Standard (AES)), where k is a symmetric key stored in symmetric key memory 116 and t is a current time (e.g., measured in minutes) produced by clock 114 (that is initially synchronized with clock 115 of application server 108). During authentication (at 210), the ciphertext $s_t$ is deciphered to plaintext $t_s$ using a symmetric cipher E (that is shared with the symmetric cipher E of the CAPTCHA token 102) defined as $t_s=E_k(s_t)$, where k is a symmetric key stored in symmetric key memory 117 (that is the same as the symmetric key 116 of the CAPTCHA token 102). The challenge ct issued by the application server 108 is satisfied when the deciphered plaintext $t_s$ is found by comparator 124 to be within a given range of (i.e., or approximates) the current time t output by clock 115 (that is synchronized with the clock 114 of the CAPTCHA token 102). Once the challenge $c_t$ is satisfied the application server 108 allows the user computer 106 to access the application 112.

In an alternate embodiment (at 208), the response $s_t$ is produced from a sequence of one-way hash $(s_1, s_2, s_3, \ldots)$ computed using a cryptographic hash function. One example of a cryptographic hash function, which has the properties of one-wayness (i.e., irreversibility) and collision-resistance, is the Secure Hash Algorithm (SHA-1) that is specified in the Secure Hash Standard (SHS), which may be used to generate as output the response $s_t$ from a secret key and a synchronization measure (such as a counter) that is shared by the CAPTCHA token 102 and the application server 108. In this alternate embodiment, both the CAPTCHA token 102 and the application server 108 each produce a similar one-way hash from a shared secret key and a shared synchronization measure using a shared cryptographic hash function. The challenge is satisfied when the two are similar.

D. CAPTCHA Input Devices

Another embodiment of a physical CAPTCHA is a physical CAPTCHA input device (e.g., a joystick) that may be used on its own or in combination with a CAPTCHA token for verifying human presence in an online environment. The physical CAPTCHA input device combines two functionalities: (1) it records an input stream produced by physical action that is relayed to an online application (e.g., application 112); and (2) it ensures that the input stream is authenticated and comes from a tamper-proof input device. Effectively, such a physical CAPTCHA input device is used to mediate physical action applied to the input device between the application and a human user. Advantageously, a human user is adapted to exert such physical action to such a physical CAPTCHA input device faster and more reliably than a machine. Thus, unlike the CAPTCHA token which servers to ensure human presence, CAPTCHA input devices serve also to ensure human play (i.e., that all interactions come from a human user). For example, joysticks and other small game input devices may be modified to be tamper-proof and include an authentication mechanism. Applications (e.g., an online multi-player game) that use such a modified joystick (or other input device) would ensure that there is no other way for a human user (e.g., player) to send inputs to the application than by physical action with the joystick (e.g., pressing, pushing, etc.).

E. Miscellaneous

To recapitulate, there has been disclosed hardware-based "physical" CAPTCHA tests for allowing an online application to distinguish a human user from an automated agent based on the human's ability to interact with the physical token or input device. While human players may readily perform physical actions such as pressing a button, moving a joystick, taping or tracing on a touch-sensitive area, automation of such physical actions is difficult and costly depending on the action. Advantageously over digital CAPTCHA tests, CAPTCHA tests with a physical action component may be resistant to relay attacks, may be less intrusive, and may require all interaction with an online application to originate from a human user.

More specifically, the CAPTCHA token is resistant to relay attacks because they may not be readily delegated by an automated player agent as may a digital CAPTCHA test. In addition, the CAPTCHA token is also resistant to delegation from one user who is human to another user who is human because a CAPTCHA token may not be forwarded to a plurality of locations at one time, as may a digital CAPTCHA test through an electronic medium using email or the like. In addition, the CAPTCHA token is also resistant to delegation because of the logistics, complexity, time and trust involved in mailing a physical object from one location to another that may, for example, be required to be used over a period of time to satisfy one or more challenges and that may be required to be returned to or exchanged with the application provider either once the application is no longer used by the user or on a period basis or randomly on demand (which each may be used as an additional challenge to the user).

In one embodiment disclosed herein, the physical CAPTCHA is a token that computes an authenticated sequence of time-dependent responses. To learn the current response of the token, a user operating in an online environment must physically interact with the token in a prescribed manner defined by randomly issued interaction instructions. The physical interaction prescribed by the interaction instructions varies depending on the form factor of the CAPTCHA token. For example, the form factor may include any one or more of a combination of: depressing keys on a keypad, tapping or tracing on a sensitive pad or screen, etc. Upon satisfying the interaction instructions issued by the token, the token makes available the current time-dependent response for a defined period of time, which the user submits as proof of being human when responding to a challenge issued by an online application.

Additional information concerning the disclosed hardware-based "physical" CAPTCHA token is described in the following publications incorporated herein in their entirety by reference: Philippe Golle and Nicolas Ducheneaut, "Preventing Bots from Playing Online Games", in the ACM Computers in Entertainment, Vol. 3, July, 2005; and Philippe Golle and Nicolas Ducheneaut, "Keeping bots out of online games", ACM SIGCHI International Conference on Advances in Computer Entertainment Technology, Valencia Spane, Jun. 15-17, 2005.

Those skilled in the art will recognize that a general purpose computer may be used as an apparatus for implementing the computational units of the operating environment shown in FIG. 1 and described herein. Such a general purpose computer would include hardware and software. The hardware would comprise, for example, memory (ROM, RAM, etc.) (e.g., for storing processing instructions of the CAPTCHA token, the user computer, and the application server), a processor (i.e., CPU) (e.g., coupled to the memory for executing the processing instructions of the CAPTCHA token, the user computer, and the application server), persistent storage (e.g., CD-ROM, hard drive, floppy drive, tape drive, etc.), user I/O, and network I/O. The user I/O (or user input devices) may include a camera, a microphone, speakers, a keyboard, a pointing device (e.g., pointing stick, mouse, etc.), and a display. The network I/O (such as connection 110) may for example be coupled to a network such as the Internet. The software of the general purpose computer would include an operating system and application software providing the functions performed in the example operating environment shown and described in FIG. 1.

Further, those skilled in the art will recognize that the forgoing embodiments may be implemented as a machine (or system), process (or method), or article of manufacture by using standard programming and/or engineering techniques to produce programming software, firmware, hardware, or any combination thereof. It will be appreciated by those skilled in the art that the flow diagram described in the specification is meant to provide an understanding of different possible embodiments. As such, alternative ordering of the steps, performing one or more steps in parallel, and/or performing additional or fewer steps may be done in alternative embodiments.

Any resulting program(s), having computer-readable program code, may be embodied within one or more computer-usable media such as memory devices or transmitting devices, thereby making a computer program product or article of manufacture according to the embodiment described herein. As such, the terms "article of manufacture" and "computer program product" as used herein are intended to encompass a computer program existent (permanently, temporarily, or transitorily) on any computer-usable medium such as on any memory device or in any transmitting device.

Executing program code directly from one medium, storing program code onto a medium, copying the code from one medium to another medium, transmitting the code using a transmitting device, or other equivalent acts may involve the use of a memory or transmitting device which only embodies program code transitorily as a preliminary or final step in making, using, or selling the embodiments as set forth in the claims.

Memory devices include, but are not limited to, fixed (hard) disk drives, floppy disks (or diskettes), optical disks, magnetic tape, semiconductor memories such as RAM, ROM, Proms, etc. Transmitting devices include, but are not limited to, the Internet, intranets, electronic bulletin board and message/note exchanges, telephone/modem based network communication, hard-wired/cabled communication network, cellular communication, radio wave communication, satellite communication, and other stationary or mobile network systems/communication links.

A machine embodying the embodiments may involve one or more processing systems including, but not limited to, CPU, memory/storage devices, communication links, communication/transmitting devices, servers, I/O devices, or any subcomponents or individual parts of one or more processing systems, including software, firmware, hardware, or any combination or subcombination thereof, which embody the disclosure as set forth in the claims.

While particular embodiments have been described, alternatives, modifications, variations, improvements, and substantial equivalents that are or may be presently unforeseen may arise to applicants or others skilled in the art. Accordingly, the appended claims as filed and as they may be amended are intended to embrace all such alternatives, modifications variations, improvements, and substantial equivalents.

What is claimed is:

1. A computer implemented method for verifying human presence in an online environment, the method comprising:

issuing a challenge from a first computational unit to a second computational unit after the second computational unit communicates a request to access a service provided by the first computational unit;

computing at a third computational unit a response using a function that takes as input a synchronization measure and a symmetric key shared with the first computational unit; the computed response being computed for satisfying the challenge issued by the first computational unit to the second computational unit;

displaying the computed response on a user interface of the third computational unit only if interaction instructions involving a physical challenge output on the user interface are satisfied;

receiving input at the second computational unit representing the computed response displayed on the user interface of the third computational unit;

transmitting the input received representing said computed response from the second computational unit to the first computational unit for satisfying the challenge issued by the first computational unit;

authenticating, at the first computational unit, the computed response received from the second computational unit using a function that takes as input the computed response and the symmetric key shared with the third computational unit; and enabling, at the first computational unit, access to the service to the second computational unit in response to authenticating the computed response received from the second computational unit;

wherein said computing computes the computed response at the third computational unit with a symmetric cipher that takes as input a measure of time at the third computational unit and the symmetric key shared with the first computational unit;

wherein said enabling deciphers ciphertext received from the second computational unit using a symmetric cipher that takes as input the ciphertext and the symmetric key shared with the third computational unit.

2. The computer implemented method according to claim 1, wherein the synchronization measure shared between the first computational unit and the second computational unit is a measure of time output by one of a clock, a counter, and a nonce output by a computational unit.

3. The computer implemented method according to claim 2, further comprising synchronizing the clock of the first computational unit with the clock of the third computational unit.

4. The computer implemented method according to claim 1, wherein the response is displayed on a display touchpad of the third computational unit.

5. The computer implemented method according to claim 4, further comprising issuing at the third computational unit interaction instructions on the display touchpad that specify inputting a sequence of symbols at the display touchpad.

6. The computer implemented method according to claim 4, further comprising issuing at the third computational unit interaction instructions on the display touchpad that specify tracing over a shape displayed on the display touchpad.

7. The computer implemented method according to claim 1, wherein the service provided at the first computational agent is a game.

8. The computer implemented method according to claim 1, wherein the third computational unit has no input connectivity with the first computational unit or the second computational unit.

9. An apparatus for verifying human presence in an online environment, the apparatus comprising:

a first computational unit providing a service and having a key and a synchronization measure;

a second computational unit communicating with the first computational unit; and a third computational unit having a synchronization measure and a symmetric key shared with the first computational unit;

wherein each computational unit further comprises (i) a memory for storing processing instructions and (ii) a processor coupled to the memory for executing the processing instructions;

wherein the processing instructions of the first computational unit further comprises processing instructions for (i) issuing a challenge from a first computational unit to a second computational unit after the second computational unit communicates a request to access the service provided by the first computational unit, (ii) authenticating, at the first computational unit, a computed response received from the second computational unit using a function that takes as input the response and the symmetric key shared with the third computational unit, and (iii) enabling, at the first computational unit, access to the service to the second computational unit in response to authenticating the computed response received from the second computational unit;

wherein the processing instructions of the third computational unit further comprises instructions for implementing a user interface and processing instructions for operating in (i) a first state for computing the computed response using a function that takes as input a synchronization measure and the symmetric key shared with the first computational unit; the computed response being computed for satisfying the challenge issued by the first computational unit to the second computational unit, and (ii) a second state for displaying the computed response on the user interface of the third computational unit only if interaction instructions involving a physical challenge output on the user interface of the third computational unit are satisfied;

wherein the processing instructions of the second computational unit further comprises instructions for implementing a user interface and processing instructions for (i) receiving input at the second computational unit representing the computed response displayed on the user interface of the third computational unit, and (ii) transmitting the input received representing the computed response from the second computational unit to the first computational unit for satisfying the challenge issued by the first computational unit;

wherein the computed response at the third computational unit is computed with a symmetric cipher that takes as input a measure of time at the third computational unit and the symmetric key shared with the first computational unit;

wherein ciphertext received from the second computational unit is deciphered using a symmetric cipher that takes as input the ciphertext and the symmetric key shared with the third computational unit.

10. The apparatus according to claim 9, wherein the synchronization measure shared between the first computational unit and the second computational unit is a measure of time output by one of a clock, a counter, and a nonce output by a computational unit.

11. The apparatus according to claim 10, wherein the clock of the first computational unit is synchronized with the clock of the third computational unit.

12. The apparatus to claim 9, wherein the response is displayed on a display touchpad of the third computational unit.

13. The apparatus according to claim 12, wherein interaction instructions issued on the display touchpad specify inputting a sequence of symbols at the display touchpad.

14. The apparatus according to claim 12, wherein interaction instructions issued on the display touchpad specify tracing over a shape displayed on the display touchpad.

15. The apparatus according to claim 14, wherein the service provided at the first computational agent is a game.

16. The apparatus according to claim 9, wherein the third computational unit has no input connectivity with the first computational unit or the second computational unit.

* * * * *